United States Patent [19]

Allor

[11] Patent Number: 4,557,244

[45] Date of Patent: Dec. 10, 1985

[54] METHOD OF MACHINE CUTTING SILICON METAL PARTICULATES WITH $SI_3N_4$

[75] Inventor: Richard L. Allor, Livonia, Mich.

[73] Assignee: Ford Motor Company, Dearborn, Mich.

[21] Appl. No.: 612,106

[22] PCT Filed: Apr. 13, 1984

[86] PCT No.: PCT/US84/00583

§ 371 Date: Apr. 13, 1984

§ 102(e) Date: Apr. 13, 1984

[51] Int. Cl.[4] .............................................. B28D 1/00
[52] U.S. Cl. .................................. 125/1; 51/283 R; 51/308; 409/131; 501/97
[58] Field of Search .................. 51/73 R, 308, 283 R; 125/12, 13 R, 15, 1; 409/131; 501/97, 98, 152

[56] References Cited

U.S. PATENT DOCUMENTS

| | | | |
|---|---|---|---|
| 3,078,559 | 2/1963 | Thomas | 29/413 |
| 3,836,374 | 9/1974 | Richerson | 501/97 |
| 4,227,348 | 10/1980 | Demers | 51/283 R |
| 4,227,842 | 10/1980 | Samanta | 51/309 |
| 4,264,548 | 4/1981 | Ezis | 51/307 |
| 4,304,576 | 12/1981 | Hattori | 51/309 |
| 4,323,325 | 4/1982 | Samanta | 51/309 |
| 4,350,771 | 9/1982 | Smith | 501/97 |
| 4,425,141 | 1/1984 | Buljan | 51/308 |

*Primary Examiner*—Harold D. Whitehead
*Attorney, Agent, or Firm*—Joseph W. Malleck; Roger L. May

[57] ABSTRACT

A method is disclosed of machine cutting a semidense silicon comprising particulate body by relatively moving a substantially fully dense silicon nitride cutting tool against the body. The silicon nitride tool experiences increased tool life over that of carbides or tool steels heretofore used to machine cut low density, highly abrasive metals.

15 Claims, No Drawings

METHOD OF MACHINE CUTTING SILICON METAL PARTICULATES WITH SI3N4

TECHNICAL FIELD

This invention relates to the use of densified silicon nitride powder as a cutting tool for a low density silicon metal body.

BACKGROUND OF THE INVENTION AND PRIOR ART STATEMENT

Densified silicon nitride has been developed as a structural material for high tempratuare applications and only recently has been discovered to be particularly useful for cutting cast iron, provided the composition is modified by certain second phases (see U.S. Pat. No. 4,323,323). One attempt by the prior art to machine a metal other than cast iron (namely, aluminum) with a spinel modified $Si_3N_4$ tool, demonstrated relatively poor results (see Japanese patent No. 49-113803). It has thus become evident that silicon nitride modified to cut one fully dense metal is not universally suitable for cutting various other fully dense metals or materials.

Concurrent with the above development in the prior art, a need has arisen in the ceramic processing arts for efficiently cutting low density metal compacts from which the ceramic is made (see U.S. application Ser. No. 444,901, entitled "Method of Forming Dense Ceramic Bodies", also assigned to assignee hereof). The prior art typically uses tungsten carbide or high speed tool steels to cut low density metal compacts such as silicon. Because of the abrasive nature of silicon particles, these tools have a relatively short cutting life.

This invention deals with the use of a ceramic cutting tool to meet the need in the ceramic processing arts for cutting a low density metal compact to be subsequently converted to a ceramic. The prior art has also attempted to use a dense ceramic ($Al_2O_3$) cutting tool to cut a lower density specimen of generally the same ceramic. Such attempt was at relatively low speeds, of limited success, and thus demonstrated the narrow and unpredictable cutting characteristics of ceramics (see "Ceramic Cutting Tools for Machining Unsintered Compacts of Oxide Ceramics" by Holcomb and Rey, Ceramic Bulletin, Vol. 61, No. 12, 1982.

SUMMARY OF THE INVENTION

The invention is a method of machine cutting a semidense silicon comprising particulate body by relatively moving a substantially fully dense silicon nitride cutting tool against the body to shear off portions of the body along a predetermined path.

Preferably the machine cutting of the body is carried out to shear a path having a cross-sectional area of at least 0.01 square inch. The shearing preferably separates the silicon from the body as a powder or chips. Advantageously, the relative cutting movement is carried out by using th tool to cut deep grooves in the silicon comprising particulate body to define sub-bodies, leaving only enough ungrooved material between the sub-bodies to define hinges therebetween. The deep grooves may be cut in a grid pattern penetrating to a depth of about 90–95% of the body.

The silicon nitride tool employed preferably has a density in the range of 3.2–3.29 $gm/cm^3$ and a hardness in the range of 86–92 on the Rockwell 45-N hardness scale. The tool can be advantageously shaped as a milling tool, a turning tool, or as a grooving tool. It is advantageous if the difference in density between the silicon nitride tool and the semidense silicon comprising object is at least 1.0 $gm/cm^3$.

The semidense silicon comprising particulate body preferably has a density in the rangae of 1.0–1.9 $gm/cm^3$. The body is preferably comprised of a nonreacted heat agglomeration of silicon powder and oxygen carrying powder agents, the oxygen carrying powder agents being present in an amount so that the agglomeration, when nitrided, will consist substantially of silicon nitride and oxynitrides. To this end, the oxygen carrying agents preferably comprise about 4–12% $Y_2O_3$ and about 0.5–5% $Al_2O_3$. The oxygen carrying agents, when reacted, form a silicon nitride object with about 2–14% oxynitrides. Advantageously, the silicon comprising particulate body is shaped as a disc having a thickness of about 0.3–0.8 inch and opposed faces with a diameter of about 3–12 inches, the grooves being cut in one of said faces in the method of this invention.

The chemistry of the partially heat fused silicon comprising particulate body is made up essentially of silicon powder with up to 3% $SiO_2$ when the body is subjected to partial argon sintering. When the body is subjected to partial nitriding, it is comprised of up to 15% silicon nitride and up to 3% by weight $SiO_2$, the total silicon compounds not exceeding 20% by weight of the mixture.

BEST MODE FOR CARRYING OUT THE INVENTION

I. Semidense Materials To Be Cut and How They May Be Prepared

In the preparation of ceramics, powder compacts are typically formed of an abrasive metal (such as silicon) which is to be a constituent of the ceramic. The compact is then given some degree of handling rigidity by limited preheating under a gaseous reactive atmosphere or in a nonreactive atmosphere. The resulting semidense compact is still a metal or metal based material with a density in the range of 1.0–1.9 $gm/cm^3$. In this condition it has become desirable in the art to shape the material by cutting grooves or removing surface portions to facilitate sizing the compact before it has been converted to a ceramic and into its final shape. Not only does the silicon metal of the compact influence the performance of the cutting tool, but chemical agents present with the metal particles play a role in determining the success of the tool.

Specifically, in the making of a semidense silicon compact used to make a silicon nitride ceramic, the following may be used.

(a) Mix

A mixture of powdered silicon and reactive oxygen carrying powder agents is prepared and milled. Reactive oxygen carrying powder agents is defined herein to mean powder ingredients that are effective to form second phase crystallites, particularly oxynitrides, when reacted with silicon under a heated nitrogen atmosphere. The powder agents can be advantageously selected from the group consisting of $SiO_2$, $Y_2O_3$, $CeO_2$, $ZrO_2$, $HfO_2$, $Al_2O_3$, and other oxides or rare earths. The $Al_2O_3$ is effective in forming a small amount of protective amorphous silicate coating the crystallite or oxynitrides.

Silicon is preferably selected to have a 98% or greater purity and a starting average particle size of about 8-9.2 microns. The powder agent (such as yttria) is preferably selected to have a purity of at least 99.9% with an average crystal size of about 0.0438 microns, and the alumina is preferably selected to have a purity of at least 99.5% with an average particle size of about 0.3-0.5 microns.

The mixture is comminuted and blended by being charged into an inert milling jar along with grinding media in the form of cylinders (comprised of 85% $Al_2O_3$, 11% $SiO_2$, 2% MgO, 1.2% CaO, 0.8% of the combination of [$TiO_2$, $Fe_2O_3$, $Na_2O$ and $K_2O$]). The cylinders add $Al_2O_3$ to the mixture by attrition. The milling is carried out for 48 hours at 64 rpm, and then the mixture is separated from the milling media by use of a #10 mesh screen. The milling is preferably dry, but can be carried out wet with some accompanying disadvantages.

(b) Compaction

A measured quantity of the milled mixture is loaded into a cold press die arrangement and pressed at ambient conditions by use of 1400-1500 psi to form a cylindrical compact of the size of about 6 inches in diameter and 0.6 inch in thickness, and a density of about 1.0-1.7 gm/cm$^3$, preferably 1.4 gm/cm$^3$. The compact here formed is a round disc having a black coloration because of the presence of the silicon metal powder. The disc preferably has a thickness of about 0.3-0.8 inch and opposed faces with a diameter of about 3-12 inches.

(c) Partial Sintering

The cold compacted body is placed in a furnace and partially fused in an inert atmosphere (such as argon) at a temperature of about 2000°-2200° F. for a period of about 1-4 hours with no change in density. At this temperature level some reaction will take place between the constituents of the powdered mixture, providing a very small amount of necking between the particles of the body, thereby imparting strength. Alternatively, the body may be only partially nitrided under a heated nitrogen atmosphere to retain the density of compaction. Again, alternatively, the body may be formed by slip casting the desired silicon powder mixture to form a body having a density in the range of 1.5-1.9 gm/cm$^3$.

This then is the material which is to be machine cut by the silicon nitride cutting tool. The material, most importantly, is characterized by being polycrystalline; that is, it is comprised of discrete powder particles that have been agglomerated together forming a semidense particulate body. The density will be in the range of about 1.0-1.9 gm/cm$^3$.

II. Machine Cutting Process

In a preferred mode, the partially nitrided or presintered or slip cast body, in the form of a round disc, is machine cut in a milling process by using a silicon nitride cutting tool. The tool is moved relatively against the body to create deep grooves in one face or surface of the disc body along a grid pattern. The grooves in the grid pattern define rectangular sub-bodies or configurations therebetween. The grooves are cut to a depth of 90-95% of the thickness of the disc, leaving approximately 0.050 inch at the opposed side of the disc which defines a hinge or residual membrane between sub-bodies. The hinge can be severed or broken after the disc is fully densified. The hinge should be of sufficient structural strength to admit such subsequent densification and such eventual severance.

The cutting tool preferably is comprised of a fully densified, hot pressed silicon nitride body containing beta silicon nitride, 2.9-14.4% by weight silicon oxygen nitrides enveloped by a silicate phase having a thickness of 2-10 angstroms and having little or no microporosity. The tool has a fracture strength of about 85,000 psi at 1200° C. in a 4-point bend test. Details as to how to make the fully densified, hot pressed silicon nitride tool are disclosed in copending U.S. application Ser. No. 444,251, assigned to the assignee of this invention, and the disclosure of which is incorporated herein by reference.

III. Subsequent Processing After Machine Cutting (a) Fully Nitriding the Grooved Body The grooved body may then be placed in a furnace and nitrided under a nitriding atmosphere at a temperature of about 2200°-2600° F. for a period of 96 hours. The details of a preferred method of nitriding are explained in U.S. application Ser. No. 448,889, assigned to the assignee of this invention, the disclosure of which is incorporated herein by reference.

(b) Hot Pressing to Full Density

The nitrided body is then fully densified by heating in a furnace to a hot pressing temperature of about 1725° C. under a pressure of about 4000 psi for a period of time sufficient to bring the density of such material to about 3.2-3.29 gm/cm$^3$. Upon cooling of the hot pressed body, the sections of the membrane between the grooved portions may be separated by fracturing, resulting in a finished hot pressed product sized as a cutting tool.

EXAMPLES

The advantage of cutting elemental silicon with a fully densified silicon nitride cutting tool is the dramatic increase in cutting tool life. The cutting tool usually lasts ten times longer than comparable cutting tools that have been used heretofore to cut silicon. For example, a ten-fold increase in durability has been achieved over a cutting tool of tungsten carbide when cutting low density silicon metal particulate bodies.

To readily illustrate the wear resistance of the cutting tool used in this preferred mode, a 6 inch diameter cylinder by 6 inch high was fabricated as described in Section I above and specifically included a uniform powder mixture with 2000 grams of silicon (86.6 weight percent of the mixture), 278 grams of $Y_2O_3$ (12 weight percent of the mixture and 13.9% of the silicon), and 32 grams of $Al_2O_3$ (1.4 weight percent of the mixture and 1.6% of the silicon). The useable range for the oxygen carrying powder agents was 0.4-2.3 molar percent of the mixture and 0.4-2.4 molar percent of the silicon. $Y_2O_3$ is normally used in the range of 3-19% by weight of the silicon and 3.2-15.6% by weight of the mixture. The aluminum oxide is used in the range of 0.4-5% by weight of the silicon and 0.4-4.0% by weight of the mixture. $SiO_2$ can be present usually as an oxide on the silicon powder and is increased to 1-3% by weight of the silicon by milling.

The cylinder had a partially fused density of 1.5 gm/cm$^3$. This cylinder was placed in a lathe chuck and rotated at 126 rpm (which is generally twice as fast as the speed normally used when employing conventional tools).

First, a densified silicon nitride cutting tool (processed with chemistry disclosed in U.S. application Ser. No. 444,251 referred to earlier) was used to mill the cylinder at a feed rate of 0.013 inch per revolution and a depth of cut of 0.10 inch. After milling 23.25 lineal feet of the cylinder surface, the $Si_3N_4$ tool exhibited an average wear of depth of about 0.004 inch (measured in a direction on the tool normal to a tangent at the point of contact with the cylinder surface)

Second, a conventional tungsten carbide cutting tool of commercial grade was used to cut 20.5 lineal feet of the cylinder under the same cutting conditions used for the $Si_3N_4$ tool. The WC tool experienced a tool wear of 0.02 inch.

Third, a conventional high speed tool steel cutting tool was used, again under the same cutting conditions, to remove 20.2 lineal feet, resulting in 0.031 average wear. The $Si_3N_4$ tool experienced considerably less wear.

I claim:

1. A process of machine cutting a semidense polycrystalline silicon comprising particulate body by relatively moving a substantially fully dense silicon nitride cutting tool against said semidense silicon comprising particulate body to shear off portions of said body along a predetermined path.

2. The process of machine cutting as in claim 1, in which the density of said semidense silicon comprising particulate body is in the range of 1.0–1.9 $gm/cm^3$ and said cutting tool has a density in the range of 3.20–3.29 $gm/cm^3$.

3. The process of machine cutting as in claim 1, in which the path sheared by said tool has a cross-sectional area of at least 0.01 inch.

4. The process of machine cutting as in claim 1, in which said relative movement of said cutting tool is carried out by using said tool to cut deep grooves in said silicon comprising particulate body to define sub-bodies, leaving only enough ungrooved material between said sub-bodies to define hinges therebetween of sufficient structural strength to admit subsequent densification and eventual severance.

5. The process of machine cutting as in claim 4, in which said deep grooves are cut in a grid pattern penetrating to a depth of 90–95% of said body.

6. The process of machine cutting as in claim 1, in which said shearing separates the silicon from said body as a powder or chips.

7. The process of machine cutting as in claim 1, in which said silicon nitride tool is comprised of a material having a hardness of 86–92 on the 45-N scale and has a density of 3.2–3.29 $gm/cm^3$.

8. The process of machine cutting as in claim 1, in which the difference in density between said silicon comprising particulate body and said silicon nitride cutting tool is at least 1.0 $gm/cm^3$.

9. The process of machine cutting as in claim 1, in which said cutting tool is shaped as a milling tool, a turning tool, or a grooving tool.

10. The process of machine cutting as in claim 4, in which said silicon comprising particulate body is shaped as a disc having a thickness of about 0.3–0.8 inch and opposed faces with a diameter of about 3–12 inches, said grooves being cut in one of said faces of said body.

11. The process of machine cutting as in claim 1, in which the semidense silicon comprising particulate body is polycrystalline with discrete silicon particles agglomerated together.

12. The process of machine cutting as in claim 1, in which said silicon comprising particulate body is comprised of nonreacted heat agglomerated silicon powder and oxygen carrying powder agents, the oxygen carrying powder agents being present in an amount so that upon nitriding the mixture will consist essentially of silicon nitride and oxynitrides.

13. The process of machine cutting as in claim 12, in which the oxygen carrying agents comprise 4–12% $Y_2O_3$ and 0.5–5.0% $Al_2O_3$, the oxygen carrying agents, when reacted, form a $Si_3N_4$ object with about 2–14% oxynitrides.

14. The process of machine cutting as in claim 1, in which said body to be cut is presintered and is made up essentially, by weight, of silicon powder with up to 3% $SiO_2$.

15. The process of machine cutting as in claim 1, in which said body to be cut is prenitrided and is made up essentially of, by weight, about 15% $Si_3N_4$, up to 3% $SiO_2$, up to 20% silicon compounds, and the remainder silicon.

* * * * *